United States Patent [19]

Castellani Longo

[11] 4,229,640
[45] Oct. 21, 1980

[54] WORKING PIECES BY LASER BEAM

[75] Inventor: Massimo Castellani Longo, Turin, Italy

[73] Assignee: R.T.M.-Istituto per le Ricerche di Tecnologia Meccanica, Vico Canavese (Turin), Italy

[21] Appl. No.: 4,128

[22] Filed: Jan. 17, 1979

[30] Foreign Application Priority Data

Jan. 18, 1978 [IT] Italy ............................ 67089 A/78

[51] Int. Cl.³ ............................................. B23K 27/00
[52] U.S. Cl. ........................ 219/121 LJ; 219/121 L; 409/136
[58] Field of Search ..... 219/121 L, 121 LM, 121 EB, 219/121 EM; 82/1, 1 C; 408/56; 409/136; 228/160

[56] References Cited

U.S. PATENT DOCUMENTS

| 2,600,453 | 6/1952 | Weingart ........................ 408/56 X |
| 3,670,606 | 6/1972 | Blomgren, Sr. et al. ........ 409/136 X |

*Primary Examiner*—C. L. Albritton
*Attorney, Agent, or Firm*—Sughrue, Rothwell, Mion, Zinn and Macpeak

[57] ABSTRACT

A laser-assisted machining process for the machining of materials which are normally difficult to work employs a laser source and associated reflecting means which focus the laser beam onto two distinct areas of the workpiece material to effect localized heating thereof and assist the formation of shavings by a cutting tool: one area is immediately in front of the cutting edge of the tool and the other is adjacent the leading face of the tool, in part of the workpiece material which is deformed plastically by the tool in the formation of a shaving.

4 Claims, 4 Drawing Figures

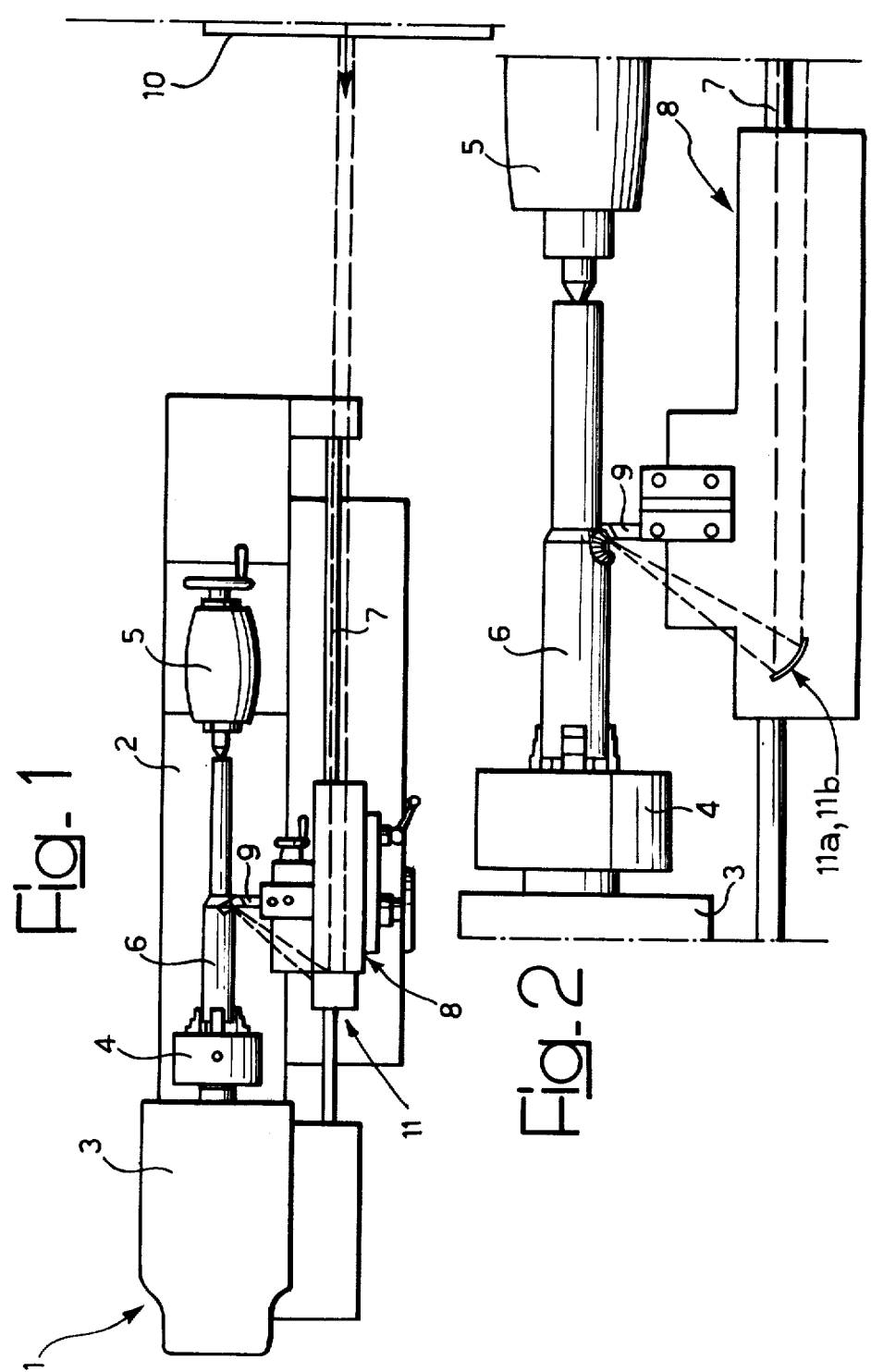

WORKING PIECES BY LASER BEAM

The present invention relates to a process for the laser-assisted machining of materials by removal of shavings, particularly for machining materials which are normally difficult to machine.

A known technique for machining such materials employs the application of heat to a workpiece being machined to cause a softening of the workpiece material and in consequence to facilitate the machining operation. It is necessary, however, that only that portion of the material which is to be removed by the cutting tool should be subjected to an intense heat, so as not to cause permanent damage to the remaining material of the workpiece as a result of such heating.

One known machining process, described in British Pat. No. 1,351,140 employs a plasma tube to effect said heating of the workpiece material. The bulk of such apparatus, however, does not readily permit the localised heating of small areas of the material of a workpiece in close proximity to a cutting tool.

The main object of this invention is the provision of a process for machining of materials by the removal of shavings, particularly materials which are difficult to machine, which affords a greater ease in machining compared with processes used hitherto.

With this object in view the present invention provides a process for machining a material by the removal of shavings using a cutting tool, in which the material about to be removed by the cutting tool is heated locally by means of a laser beam in two distinct areas: a first area immediately in front of the cutting edge of the tool and a second area in a part of the material which is deformed plastically by the tool, adjacent a leading face of the tool.

The process of this invention subjects the material about to be removed by the cutting tool to an intense and localised heating in the two areas in proximity to the cutting edge of the machine tool, without any danger of damage to the finished workpiece, thanks to the sharp beam focussing which is characteristic of laser beams. The heating of the workpiece material about to be removed by the cutting tool in correspondence with an area adjacent the cutting edge of the tool causes a softening of the material facilitating the machining and decreasing the wear both on the cutting edge and on the back face of the tool. The localized heating, resulting in the plastic deformation of the material adjacent to the cutting edge of the tool, also results in greater ease of machining and a reduced wear of the breast or leading face of the tool.

The greater ease in machining obtained by means of the present invention, compared with previously known processes, as a result of the localized heating of the material in proximity to the cutting tool, allows a greater cutting speed, a greater cutting depth on each pass of the tool, and a reduced driving power compared with known machining processes, one or more of these advantages being obtainable simultaneously.

Another object of the invention is to provide an apparatus for carrying out the aforesaid process comprising support means for the workpiece to be machined, a cutting tool, means for effecting relative movement between the workpiece and the tool, a laser source which generates a laser beam, and reflecting means for converging the laser beam into two distinct areas close to the cutting edge of the tool in the material about to be removed by the said tool.

According to a preferred characteristic of the apparatus according to this invention the reflecting means are movable with the tool relative to the workpiece and comprise a first concave mirror element arranged to focus the laser beam onto one of the two areas and a second concave mirror element arranged to focus the laser beam onto the other of the two areas, and means for adjusting the position of the reflecting means with respect to the tool and for adjusting the angular orientation of said reflecting means. The reflecting means would in practice be so adjusted that the laser beam is directed by the reflecting means parallel to the cutting edge of the machine tool for the type of tool being used.

The invention is particularly advantageous when a ceramic tool is used. In this case, before and after the machining operation, when the tool is not in a working engagement with the workpiece, the laser beam is directed onto an area of the tool itself, adjacent its cutting edge. In this way the tool can be kept at a more uniform temperature, reducing the sharp changes of temperature and temperature-induced stresses which would otherwise occur at the beginning of the machining, when the tool comes into contact with the workpiece, and at the end of machining, when the tool ceases contact with the workpiece. The deterioration of ceramic tools, which is thought to be due in large measure to such thermal and mechanical shock, is in this way significantly retarded.

It will be understood that within the scope of the invention it is possible to heat the material of the workpiece in correspondence with a single area.

The invention will be further described, by way of non-limiting example, with reference to the accompanying drawings, in which:

FIG. 1 is a plan view of a machine tool according to one embodiment of the invention, used for turning;

FIG. 2 is a plan view of a detail of FIG. 1, on an enlarged scale;

Figure 3:
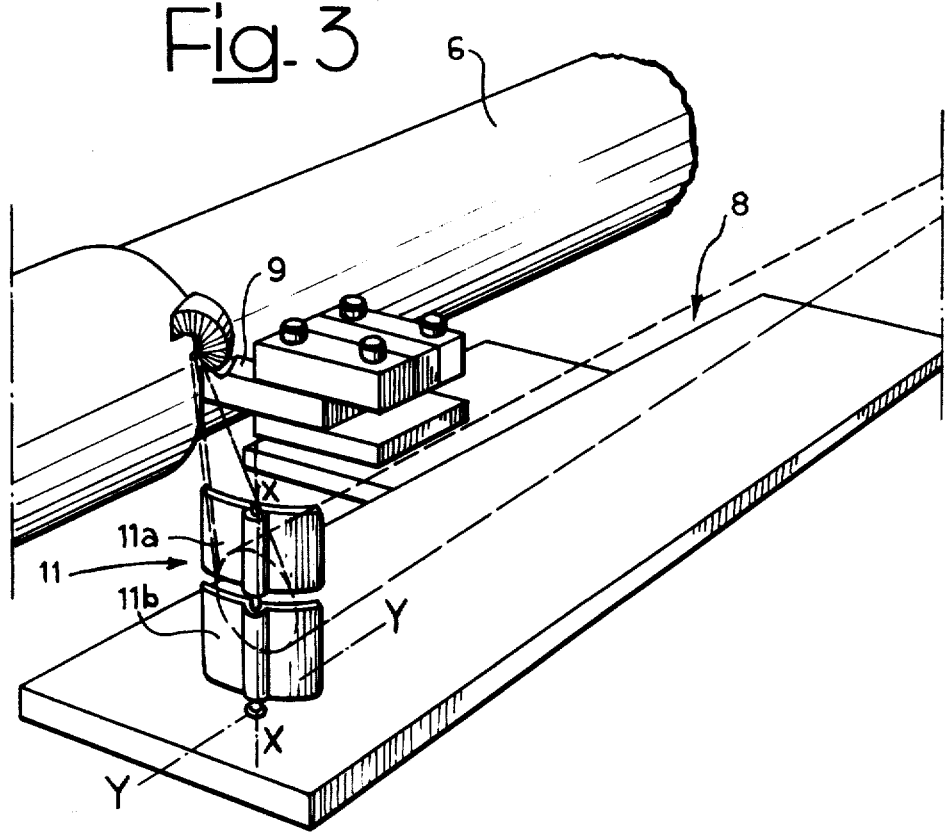
FIG. 3 is a perspective view of part of the machine tool shown in FIG. 1.

In FIG. 1, reference numeral 1 indicates generally a machine tool in the form of a lathe having a bed 2 which carries a driven headstock 3 which effects rotation of an autocentring chuck 4, and a tailstock 5. The autocentring chuck 4 and the tailstock 5 are adapted to support a workpiece 6 to rotate it about its longitudinal axis.

A longitudinal guide 7 on the bed 2 slidingly supports a tool-carrier 8 which carries a cutting tool 9 for controlled movement relative to the workpiece 6.

A laser source 10 is arranged to direct a laser beam in a direction parallel to the axis of the workpiece 6; the laser beam is reflected by a composite mirror 11 so as to assume a direction substantially parallel to the cutting edge of the tool 9 and to converge into two distinct areas, in proximity to the cutting edge of the tool 9, in the material about to be removed by the tool 9.

The composite mirror 11 comprises two concave mirror elements 11a and 11b each of which focuses the laser beam into a different said area. The mirror 11 is adjustable angularly about a vertical axis X—X (FIG. 3) and axially along a horizontal axis Y—Y, parallel to the axis of the workpiece 6. Such adjustments are necessary in order to set the mirror 11 for use with different types of cutting tool 9, the mirror 11 being adjusted so that the two beams reflected by the mirror 11 impinge on the material of the workpiece in a direction parallel to the cutting edge of the tool 9.

Figure 4:
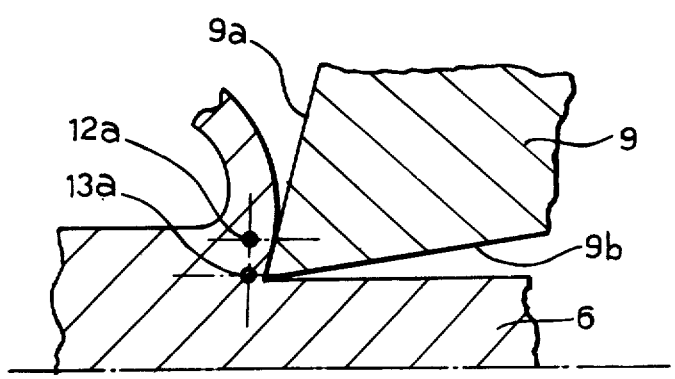
FIG. 4 illustrates diagrammatically the working area of a cutting tool engaging the workpiece in the machine tool of FIGS. 1 to 3.

FIG. 4 shows the two areas 12a, 13a, in proximity to the cutting edge of the tool 9, in which the laser beams focussed by the mirror elements 11a and 11b respectively impinge on the workpiece material about to be removed by the tool 9.

The heating of the material which is plastically deformed by the tool 9, in correspondence with the area 12a, in front of the breast or leading face of the tool 9, facilitates the machining and in particular reduces the cutting forces, with consequent less wear of the leading face 9a of the tool 9. The heating of the workpiece material immediately in front of the cutting edge of the tool 9, in the area 13a, effects a softening of the material about to be removed from the workpiece 6 and in particular facilitates the machining of the material, reducing the wear of the back face 9b of the tool 9.

It will be understood that without departing from the principle of this invention, manufacturing details and practical embodiments may be varied widely with respect to what has been described and illustrated, while remaining within the scope and spirit of the present invention.

I claim:

1. Process for machining a workpiece by the use of a cutting tool having a cutting edge and an adjacent leading face which lifts shavings from the workpiece material, the process including the localized heating of the workpiece material about to be removed by means of a laser beam arranged to heat two distinct local areas of the workpiece adjacent the cutting tool: a first area immediately in front of the cutting edge of the tool and a second area adjacent the leading face of the cutting tool in a part of the workpiece material which is deformed plastically by the tool in the formation of a shaving.

2. The process defined in claim 1, wherein, heating the tool itself by said lasar beam adjacent the cutting edge thereof before and after the machining of the workpiece by the tool.

3. Apparatus for the machining of a workpiece, comprising:
   a tool holder,
   a cutting tool carried by the holder and having a cutting edge and an adjacent leading face which in use of the tool lifts shavings from the workpiece material;
   support means for a workpiece to be machined;
   means for effecting relative movement between the workpiece and the cutting tool,
   a laser source for generating a laser beam,
   reflecting means in the path of said laser beam for converging the beam to two distinct local areas in the workpiece material to be removed by the tool, in proximity to the cutting edge of the tool.

4. The apparatus defined in claim 3, wherein the reflecting means are attached to the tool holder and are movable with the tool relative to the workpiece, the reflecting means comprising a first concave mirror element arranged to focus the laser beam onto one of said two areas and a second concave mirror element arranged to focus the laser beam onto the other of said two areas, and means for adjusting the position of the reflecting means relative to the tool, and the angular orientation of said reflecting means.

* * * * *